UNITED STATES PATENT OFFICE 2,245,650

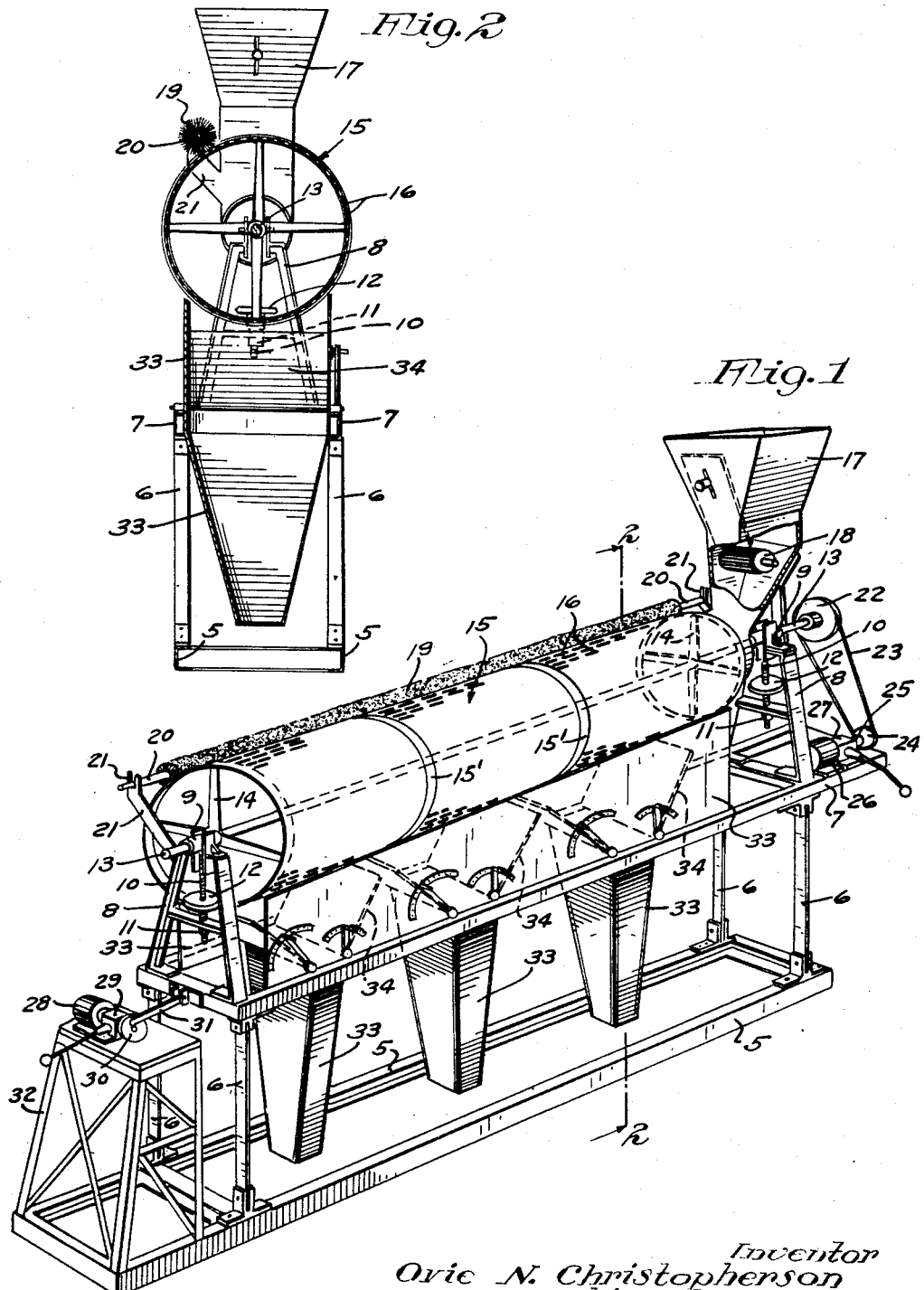

GRAIN SEPARATING MACHINE

Ovie N. Christopherson, Minneapolis, Minn.

Application August 30, 1939, Serial No. 292,649

2 Claims. (Cl. 209—287)

My invention provides an improved highly efficient machine for the separation of various grains or seeds according to their thickness or transverse diameter and, generally stated, the invention consists of the novel devices, combinations of devices and arrangement of parts hereinafter described and defined in the claims.

Various kinds of grains may be thus separated, the one kind from the other, or the seeds or grains of the same kind can be separated according to their varying thickness. For example, it is desirable for some purposes to separate barley as follows: The thinnest seeds to be used for stock feed; the next larger or thicker, for distiller purposes; and the largest or thickest for the making of malt beverages such as beer.

The invention is of such nature that a plurality of rotary separating drums may be mounted on the same platform or support and simultaneously vibrated. In the drawing, however, I have illustrated the invention involving only a single rotary separating drum mounted on a vibratory platform or support, and combined with means whereby the drum may be rotated at variable speeds and the separating frame independently reciprocated at different and variable rates of vibration.

Referring to the drawing, which illustrates the invention, and wherein like characters indicate like parts throughout the several views—

Fig. 1 is a perspective showing the complete machine, some parts being broken away; and Fig. 2 is a transverse vertical section taken approximately on the line 2—2 of Fig. 1.

The numeral 5 indicates a base frame or ground support to which the lower ends of resilient links 6 rise from the four corners thereof and support a rectangular upper frame 7 with freedom for endwise reciprocations.

On the ends of the upper frame 7 are upstanding bearing brackets 8, in the upper ends of which are bearing boxes 9 mounted for vertical adjustments under the action of upright adjusting screws 10. These adjusting screws 10 are swivelled to the bearings 9 and have threaded engagement at their lower ends with hubs 11 on the brackets 8. Also screws 10 are shown as provided with operating hand-wheels 12.

Journaled in bearings 9 is a long shaft 13 which, by means of spider-like heads 14, carry a long separating drum or cylinder 15. For the best separation according to thickness, this drum 15 has perforations in the form of slots 16, which, for a reason hereinafter stated, are preferably extended longitudinally or axially from said drum. The grain or material to be separated is adapted to be introduced into a hopper 17 that delivers into the upper and receiving end of the drum 15, and, as shown, is provided with a feed roller 18 driven in the usual or in any suitable way. The numeral 19 indicates a drum-like cleaning roller that rubs against the exterior of the separating drum. The shaft 20 of this roller 19 is loosely journaled in the pronged outer ends of arms 21 that are projected from the brackets 8. This cleaning roller 19 will be gravity held against the drum and will be rotated by friction and will serve to press out of the slots 16 any small seeds that may be caught therein.

As a means for rotating shaft 13 and hence the drum 15, the former is shown as provided with a pulley 22 that is driven by a belt 23 that runs over a pulley 24 of a shaft 25. Shaft 25 is driven from a small electric motor 26 preferably through a variable transmission mechanism 27. The casings of the transmission mechanism 27 and the motor 26 are directly mounted on the reciprocating upper frame 7.

The upper frame 7 may be reciprocated by any suitable means such, for example, as from an electric motor 28 which, through the variable speed transmission mechanism 29, drives a crank disc 30 that is connected to one end of the upper frame 7 by a link 31. As shown, the motor 28 and transmission 29 are mounted on a supporting framework 32 that is rigidly secured to one end of base frame 5.

Underlying the drum 15 is a plurality of receiving spouts 33 which, at their upper ends, are provided with pivotally adjustable wings 34. The spouts 33 may discharge onto the floor or to a point below the flooring, so far as the present invention is concerned.

The longitudinal slots in the rotary drum are much longer than any of the grains to be passed therethrough, so that the separation will be entirely according to thickness. The slots in the drum, in some instances, will be of the same width in all of the sections thereof, but in other instances, and, in fact in most instances, the slots in the sections, of which as shown there are three sections, will be progressively wider in the sections from the receiving toward the discharge end of the drum. In Fig. 1, the drum 15 is shown as made up of three sections by means of peripheral bands 15', and the perforated plates of the several sections will preferably be independently applied and hence independently replaceable.

Operation

The operation of the machine, for example, in the separation of barley according to thickness will be substantially as follows: The seeds of different thickness will be introduced into the hopper 17 and fed into the rotary drum 15. The inclination of the drum may be varied by adjustments of the bearings 9, and of course the greater the inclination of the drum, the more rapid will be the travel of the seeds axially through the drum. Of course, the travel of the seeds through the drum will also be accelerated by rotation of the drum as well as the inclination thereof. The slots in the drum will be longer than the longest seeds. Preferably, the slots in the first section will be narrower than those in the second section, and the slots in the second section will be narrower than those in the third section. Under rotation of the drum, the seeds will naturally roll and assume positions longitudinally of the drum so that they will tend to freely pass through any of the slots that are wide enough to permit their passage. The narrowest or thinnest seeds will naturally be dropped through the first section, those of the next thickness through the second section, and those of the greatest thickness through the third section. Any material that cannot pass through the slots or perforations will be discharged at the delivery end of the drum. Even when the slots in the several sections of the drum are of the same width, there will be a tendency of the narrower or thinner seeds to pass through the first and second sections, but the final graduation is produced by making the slots and the several sections progressively wider in the sections toward the delivery end of the drum. Of course, the reciprocation of the drum longitudinally or in the direction of the length of the slots greatly increases the tendency of the seeds to pass through any slots that are wide enough to pass the same.

As already indicated, the illustrated invention is such that a plurality of rotary separating drums may be applied on the same reciprocating frame or support.

The spout 33 and adjustable wings or blades 34 are preferably supported from the vibratory frame 7 so that they will take of the reciprocal movements of said frame and drum 15.

What I claim is:

1. In a separating machine, a separating screen, means for simultaneously imparting to said screen endwise reciprocating and transverse movements, said screen having elongated slots extended in the direction of its longitudinal reciprocating movement, the transverse movement thereof being crosswise of the direction of said slots.

2. The structure defined in claim 1 in which said screen is in the form of a rotary drum and the transverse movement thereof being in a constant direction.

OVIE N. CHRISTOPHERSON.